United States Patent
Xu et al.

(10) Patent No.: US 8,234,268 B2
(45) Date of Patent: Jul. 31, 2012

(54) SYSTEM, METHOD, AND COMPUTER-READABLE MEDIUM FOR OPTIMIZING PROCESSING OF DISTINCT AND AGGREGATION QUERIES ON SKEWED DATA IN A DATABASE SYSTEM

(75) Inventors: Yu Xu, San Diego, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 760 days.

(21) Appl. No.: 12/277,343

(22) Filed: Nov. 25, 2008

(65) Prior Publication Data
US 2010/0131540 A1    May 27, 2010

(51) Int. Cl.
G06F 7/00    (2006.01)
G06F 17/30    (2006.01)

(52) U.S. Cl. .................................................. 707/713
(58) Field of Classification Search .................. 707/713
See application file for complete search history.

(56) References Cited

U.S. PATENT DOCUMENTS

| | | | |
|---|---|---|---|
| 7,003,508 B1 * | 2/2006 | Shatdal | 1/1 |
| 2008/0263001 A1 * | 10/2008 | Lohman et al. | 707/2 |
| 2008/0319939 A1 * | 12/2008 | Tarin | 707/1 |
| 2009/0006346 A1 * | 1/2009 | C N et al. | 707/4 |
| 2009/0024568 A1 * | 1/2009 | Al-Omari et al. | 707/2 |
| 2009/0182720 A1 * | 7/2009 | Cain et al. | 707/4 |
| 2009/0248617 A1 * | 10/2009 | Molini | 707/2 |

* cited by examiner

*Primary Examiner* — John R. Cottingham
*Assistant Examiner* — Nicholas Allen
(74) *Attorney, Agent, or Firm* — Steve McDonald; Ramin Mahboubian (57) ABSTRACT

A system, method, and computer-readable medium for optimization of query processing in a parallel processing system are provided. Skewed values and non-skewed values are treated differently to improve upon conventional DISTINCT and aggregation query processing. Skewed attribute values on which a DISTINCT selection or group by aggregation is applied are allocated entries in a hash table. In this manner, a processing module may consult the hash table to determine if a skewed attribute value has been encountered during the query processing in a manner that precludes repetitive redistribution of rows with highly skewed attribute values on which a DISTINCT selection or group by aggregation is applied.

22 Claims, 8 Drawing Sheets

Customers 520

| | 520a | 520b | 520c |
|---|---|---|---|
| | Customer_No | SS_Num | City |
| 510a | 56789 | 111-11-1111 | New York |
| 510b | 12345 | 222-22-2222 | San Diego |
| 510c | 23232 | 333-33-3333 | New York |
| 510d | 34343 | 444-44-4444 | Galveston |
| 510e | 45454 | 555-55-5555 | Chicago |
| 510f | 56565 | 666-66-6666 | New York |
| 510g | 67676 | 777-77-7777 | New York |
| 510h | 78787 | 888-88-8888 | Chicago |
| 510i | 89898 | 999-99-9999 | New York |

| | City |
|---|---|
| 540a | New York |
| 540b | Chicago |

| | City | Count |
|---|---|---|
| 560a | New York | 5555 |
| 560b | Chicago | 3222 |

SYSTEM, METHOD, AND COMPUTER-READABLE MEDIUM FOR OPTIMIZING PROCESSING OF DISTINCT AND AGGREGATION QUERIES ON SKEWED DATA IN A DATABASE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In massively parallel processing (MPP) systems, dealing with data skew is critical to the performance of many applications. As is understood, a DISTINCT query comprises a structured query language (SQL) operation that returns results without duplicate values on an attribute. In contemporary MPP systems, a DISTINCT algorithm hash redistributes rows of a table on each processing module, such as an access module processor (AMP), based on the value in the column on which the DISTINCT keyword is applied. After the hash redistribution, each processing module removes duplicate values on the column on which the DISTINCT keyword is applied. Such an algorithm causes a system bottleneck in the presence of data skew when one or more highly skewed values appear many times in the particular column. Data skew occurs in many types of situation, such as natural demographic data skew, skew resulting from null values, or various other causes.

SUMMARY

Disclosed embodiments provide a system, method, and computer readable medium that facilitate query processing optimization in a parallel processing system. Skewed values and non-skewed values are treated differently to improve upon conventional DISTINCT and aggregation query processing. Each processing module involved in processing of a DISTINCT query has a hash table allocated thereto. The processing module reads attribute values of rows on which a DISTINCT selection is applied and determines whether the attribute value is skewed. For example, the processing module may consult a list of highly skewed attribute values associated with the table to which the query is directed. If the attribute value is skewed, the processing module evaluates the hash table to determine if the skewed attribute value has an entry in the hash table. If an entry exists in the hash table for the attribute value, the row is then discarded. If no entry exists in the hash table for the skewed attribute value, then an entry for the attribute value is added to the hash table. The row from which the attribute value was read is hash redistributed to one of a plurality of processing modules deployed in the parallel processing system on the attribute value after any necessary attribute projections. In the event that the attribute value is not determined to be skewed, then the row may be hash redistributed on the attribute value after any necessary attribute projections. In this manner, system bottlenecks resulting from the repetitive redistribution of rows with highly skewed attribute values on which a DISTINCT selection is applied are alleviated. Processing of aggregation queries are facilitated in a similar manner thereby improving parallel processing system performance.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
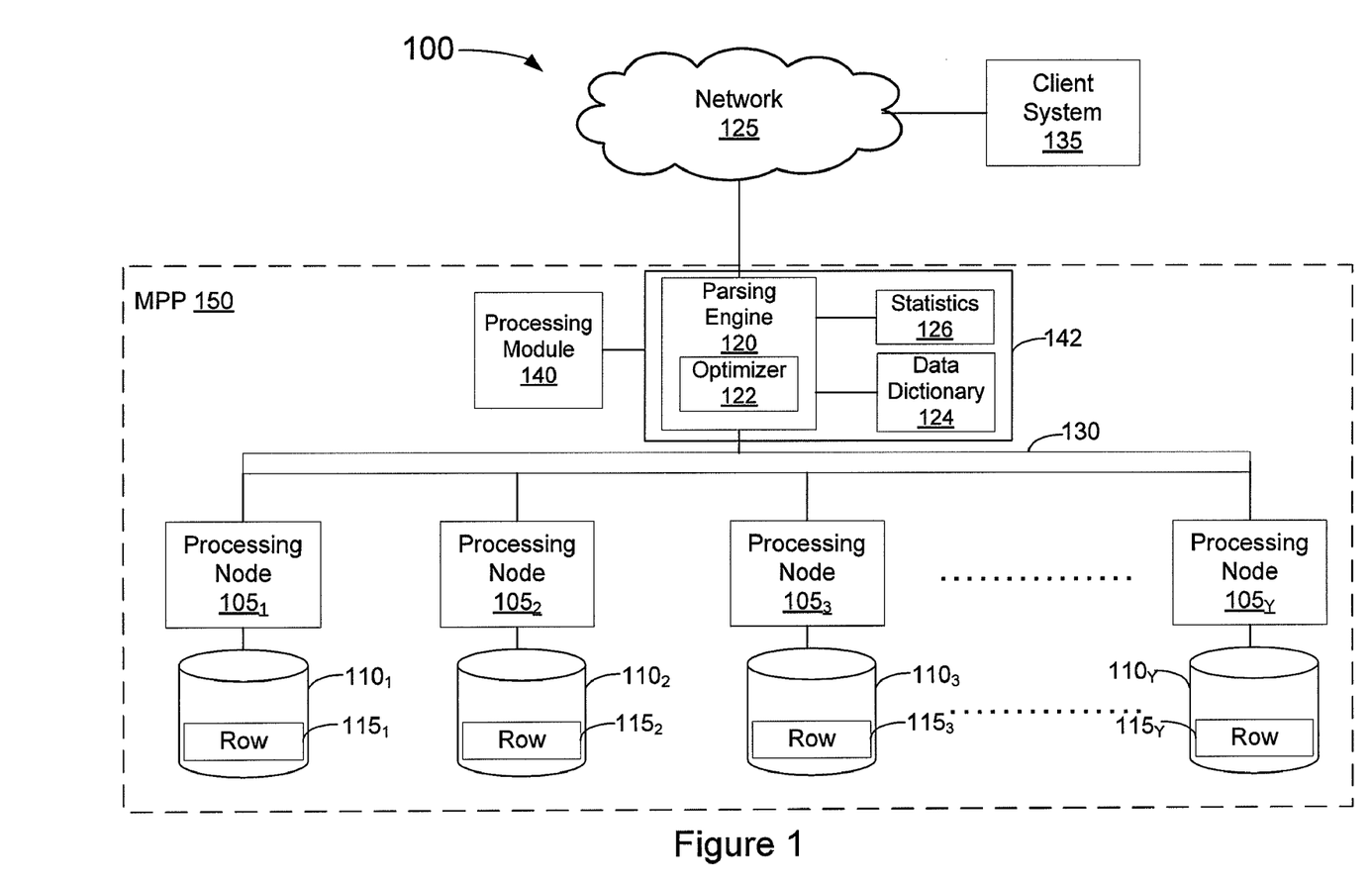
FIG. 1 depicts a diagrammatic representation of an exemplary architecture for a large database system that is suited for implementing mechanisms for optimizing distinct and aggregation operations on skewed data in accordance with disclosed embodiments.

FIG. 1 depicts a diagrammatic representation of an exemplary architecture for a large database system 100, such as a Teradata Active Data Warehousing System, that is suited for implementing mechanisms for optimizing distinct and aggregation operations on skewed data in accordance with disclosed embodiments. The database system 100 includes a relational database management system (RDBMS) built upon a massively parallel processing (MPP) system 150.

As shown, the database system 100 includes one or more processing nodes $105_1 \ldots _Y$ that manage the storage and retrieval of data in data-storage facilities $110_1 \ldots _Y$. Each of the processing nodes may host one or more physical or virtual processing modules, such as one or more access module processors (AMPs). Each of the processing nodes $105_1 \ldots Y$ manages a portion of a database that is stored in a corresponding one of the data-storage facilities $110_1 \ldots Y$. Each of the data-storage facilities $110_1 \ldots Y$ includes one or more disk drives or other storage medium.

The system stores data in one or more tables in the data-storage facilities $110_1 \ldots Y$. The rows $115_1 \ldots Y$ of the tables are stored across multiple data-storage facilities $110_1 \ldots Y$ to ensure that the system workload is distributed evenly across the processing nodes $105_1 \ldots Y$. A parsing engine 120 organizes the storage of data and the distribution of table rows $115_1 \ldots Y$ among the processing nodes $105_1 \ldots Y$ and accesses processing nodes $105_1 \ldots Y$ via an interconnect 130. The parsing engine 120 also coordinates the retrieval of data from the data-storage facilities $110_1 \ldots Y$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_1 \ldots Y$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. Further, the optimizer may utilize statistics 126 for making query assessments during construction of the query-execution plan. For example, database statistics may be used by the optimizer to determine data demographics, such as attribute minimum and maximum values and data ranges of the database. In accordance with disclosed embodiments, the statistics 126 may include one or more lists, L, of skewed attribute values of tables maintained by the system. The database system typically receives queries in a standard format, such as the Structured Query Language (SQL) put forth by the American National Standards Institute (ANSI). The parsing engine 120, the data dictionary 124, and the statistics 126 may be implemented as computer-executable instruction sets tangibly embodied on a computer-readable medium, such as a memory device 142, that are retrieved by a processing module 140 and processed thereby.

Figure 2:
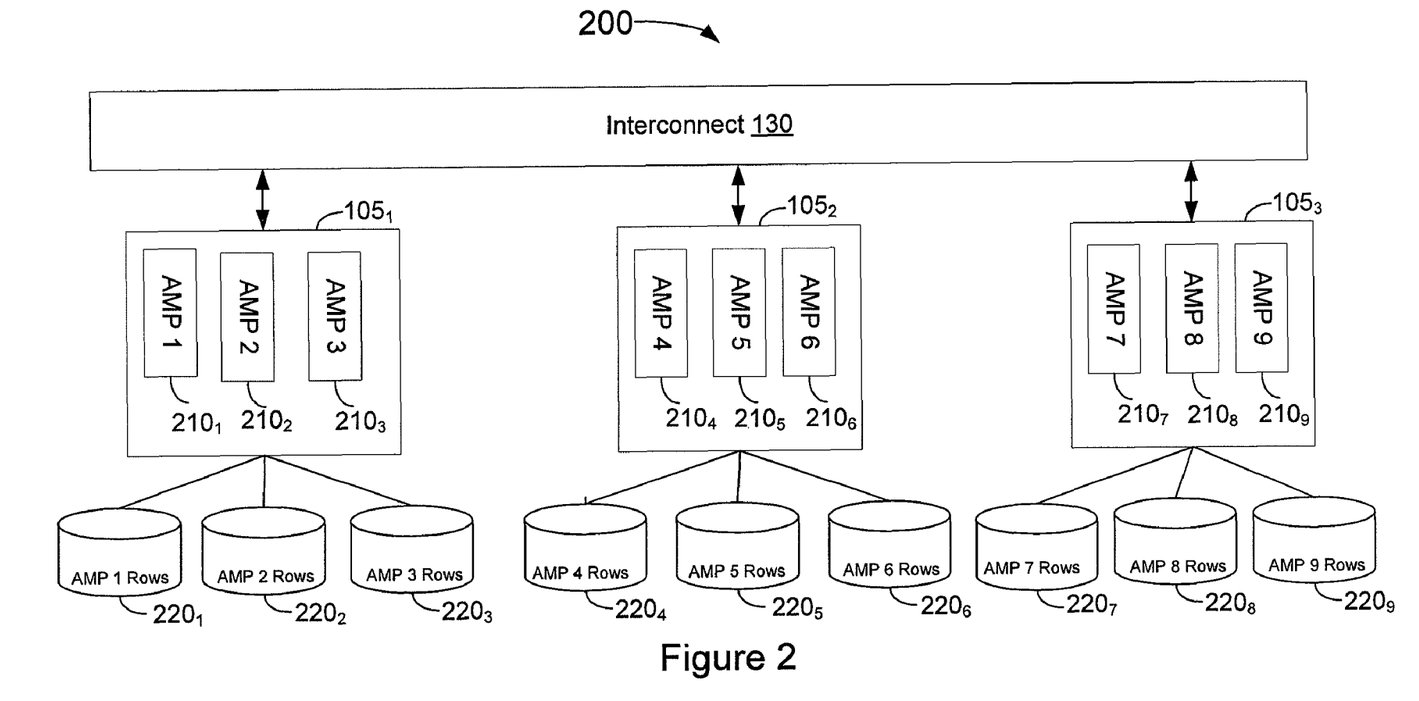
FIG. 2 is a diagrammatic representation of a massively parallel processing system configuration suitable for implementing mechanisms for optimizing distinct and aggregation operations on skewed data in accordance with disclosed embodiments.

FIG. 2 is a diagrammatic representation of an MPP configuration 200 suitable for implementing mechanisms for optimizing distinct and aggregation operations on skewed data in accordance with disclosed embodiments. In the illustrative example, each of the processing nodes $105_1$-$105_3$ are each configured with three respective AMPs $210_1$-$210_9$. The rows $115_1 \ldots Y$ of tables depicted in FIG. 1 have been distributed across the nine AMPs $210_1$-$210_9$ hosted by processing nodes $105_1$-$105_3$ such that each of the AMPs is allocated rows $220_1$-$220_9$.

Figure 3:
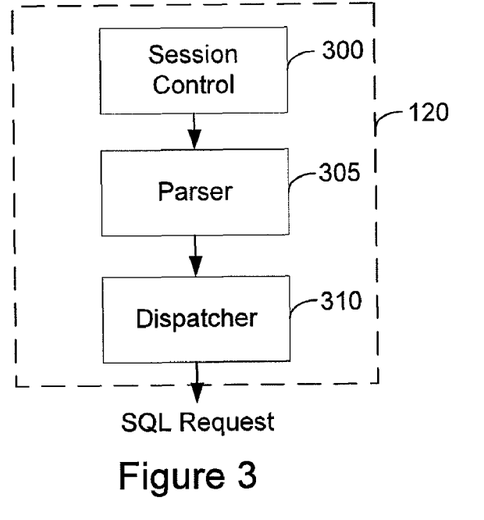
FIG. 3 is a diagrammatic representation of a parsing engine implemented in accordance with an embodiment.
Figure 4:
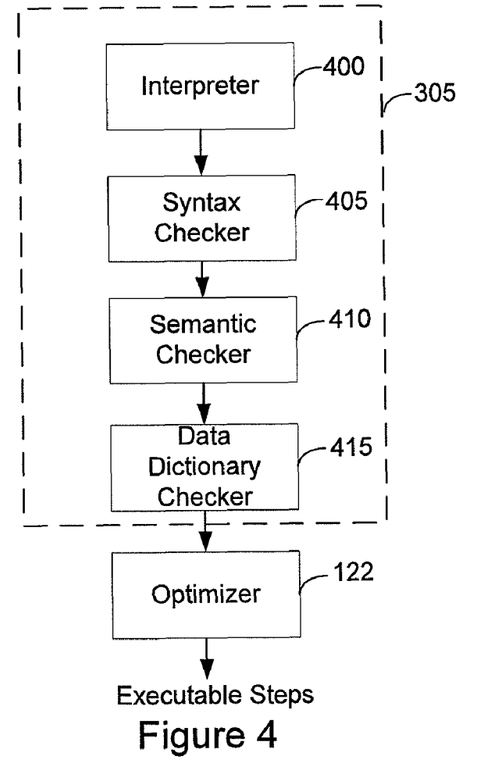
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 depicted in FIG. 1 to ensure that all of the objects specified in the SQL request exist and that the user has the authority to perform the request (block 415). Finally, the parser 305 runs the optimizer 122 that selects the least expensive plan to perform the request.

Figure 5A:
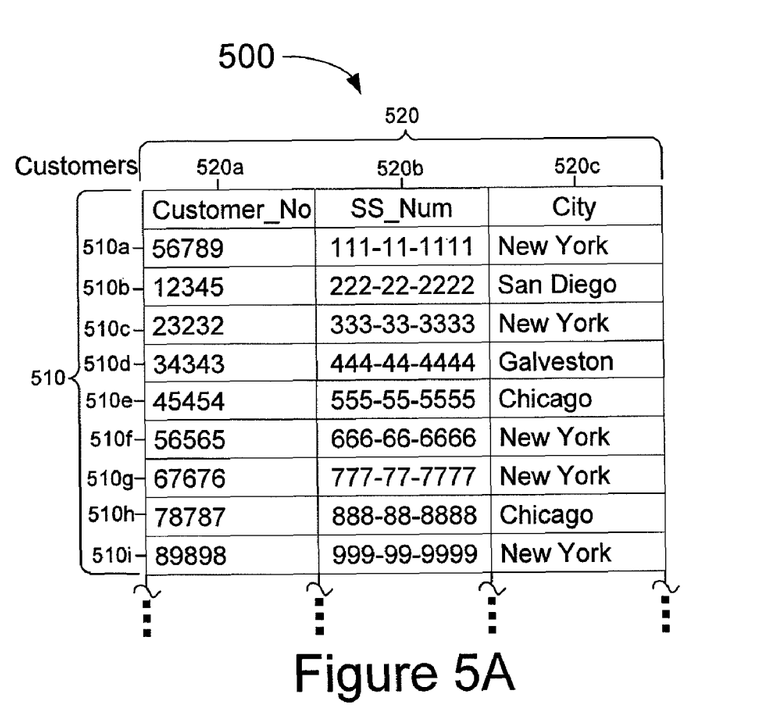
FIG. 5A is a diagrammatic representation of an exemplary table on which query optimization may be performed in accordance with disclosed embodiments.

FIG. 5A is a diagrammatic representation of a portion of an exemplary table 500 on which query optimization may be performed in accordance with disclosed embodiments. Table 500 comprises a plurality of records 510a-510i (collectively referred to as records 510) and fields 520a-520c (collectively referred to as fields 520). Each record 510 comprises data elements in respective fields, or attributes, 520. In the present example, table 500 has a table name "Customers" and includes fields 520 having respective labels of "Customer_No", "SS_Num", and "City".

Consider an exemplary query for providing distinct attribute values T.a from a table T:

SELECT DISTINCT a from T

In accordance with disclosed embodiments, mechanisms are provided which treat skewed values and non-skewed values differently to improve upon conventional DISTINCT processing in the presence of data skew. Assume the statistics 126 includes a list, L, of highly skewed values within tables maintained by the system. In the present example, assume a list, L, maintained in the statistics 126 indicates that the selected attribute, T.a, contains one or more highly skewed values.

First, a hash table, HT, is allocated on each AMP that is involved in the query. Each AMP then reads each row, r, of the table, T, allocated to the AMP on which the query is being performed. For each row, r, the AMP reads the attribute, T.a, on which the DISTINCT keyword is applied and evaluates the skewed list, L, to determine if the value of the attribute T.a is included in the list of skewed values, L. If the value of the attribute, T.a, is included in the list of skewed values, the hash table is evaluated to determine if the value of the attribute, T.a, has an entry in the hash table. If an entry exists in the hash table for the value of the attribute, T.a., of the currently evaluated row, the row is then discarded. If no entry exists in the hash table for the value of the attribute, T.a, of the row, then an entry for the attribute value is added to the hash table, and the row from which the attribute T.a was read is hash redistributed on the value of the attribute T.a after any necessary attribute projections. In the event that the value of the attribute, T.a., is not included in the skewed list, then the row is hash redistributed on the attribute T.a after any necessary attribute projections. When all rows of the table have been redistributed, each AMP may then sort the rows received thereby as a result of the redistribution and remove rows having duplicate attribute values on which the DISTINCT keyword was applied.

Although the examples provided herein depict and describe DISTINCT queries applied to one table column, the case where a DISTINCT selection may be applied to more than one column is accommodated by the disclosed embodiments in accordance with the same disclosed mechanisms. For example, consider the following DISTINCT query:

SELECT DISTINCT a, b, c from T

In this instance, no duplicate values of the combination of columns (a, b, and c in this example) are returned, while valid results may include duplicate attribute values on one or more of the attributes as long as one of the attributes differ from that of other returned attribute sets. For example, attribute sets of (1, 2, 3) and (1, 2, 4) for the attributes (a, b, c) comprise distinct attribute selections as is well understood.

Figure 6A:
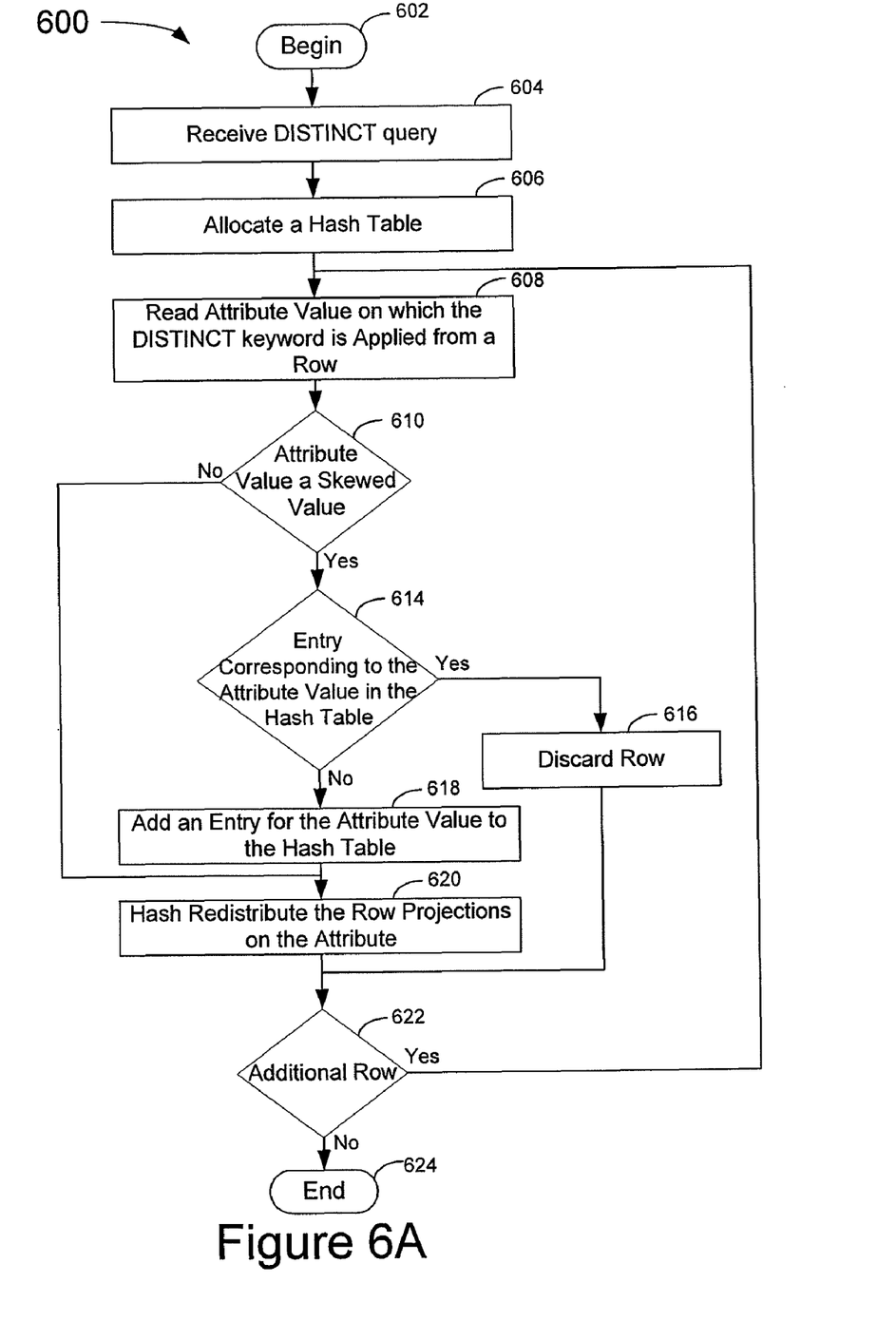
FIG. 6A is a flowchart that depicts processing of a DISTINCT query optimization routine implemented in accordance with an embodiment.

FIG. 6A is a flowchart 600 that depicts processing of a query optimization routine implemented in accordance with an embodiment. The processing steps of FIG. 6A may be implemented as computer-executable instructions tangibly embodied on a computer-readable medium executable by a processing system, such as one or more of the AMPs $210_1$-$210_9$ depicted in FIG. 2.

The query optimization routine is invoked (step 602), and a DISTINCT query execution plan is received by the AMP (step 604). A hash table is then allocated for the AMP (step 606), and an attribute value on which the DISTINCT keyword is applied is read from a row of the table (step 608). The attribute value is then compared with the list, L, of skewed values and an evaluation is made to determine if the attribute value of the currently evaluated row comprises a skewed value (step 610). If the attribute value is not a skewed value, the row may be hash redistributed on the attribute value after any necessary attribute projections (step 620). For example, the AMPs may be configured with a "hash value"-to-"processing module" mapping table. The AMP applies a hash function to the attribute value on which the DISTINCT keyword is applied, the hash value (or a portion thereof) is taken to map the hash value to an integer referred to as a hash bucket, and then the hash bucket is mapped to a particular processing module, e.g., AMP. The row is then redistributed to the AMP to which the hash bucket is mapped.

Returning again to step 610, if the attribute value comprises a skewed value, the hash table is evaluated to determine if an entry exists for the skewed attribute value (step 614). If an entry already exists for the skewed attribute value in the hash table, the row currently being evaluated may be discarded (step 616). The query optimization routine may then proceed to determine if any additional rows remain for evaluation according to step 622.

Returning again to step 614, if there is no entry in the hash table for the skewed attribute value, an entry for the attribute value is added to the hash table (step 618), and the row may then be hash redistributed on the attribute after any necessary attribute projections according to step 620, e.g., according to a "hash value"-to-"processing module" mapping table. An evaluation may then be made to determine if additional rows remain according to step 622. If another row remains, the query execution routine may read the attribute value on which the DISTINCT keyword is applied according to step 608. When no additional rows remain, the query execution routine cycle may then end (step 624).

Figure 6B:
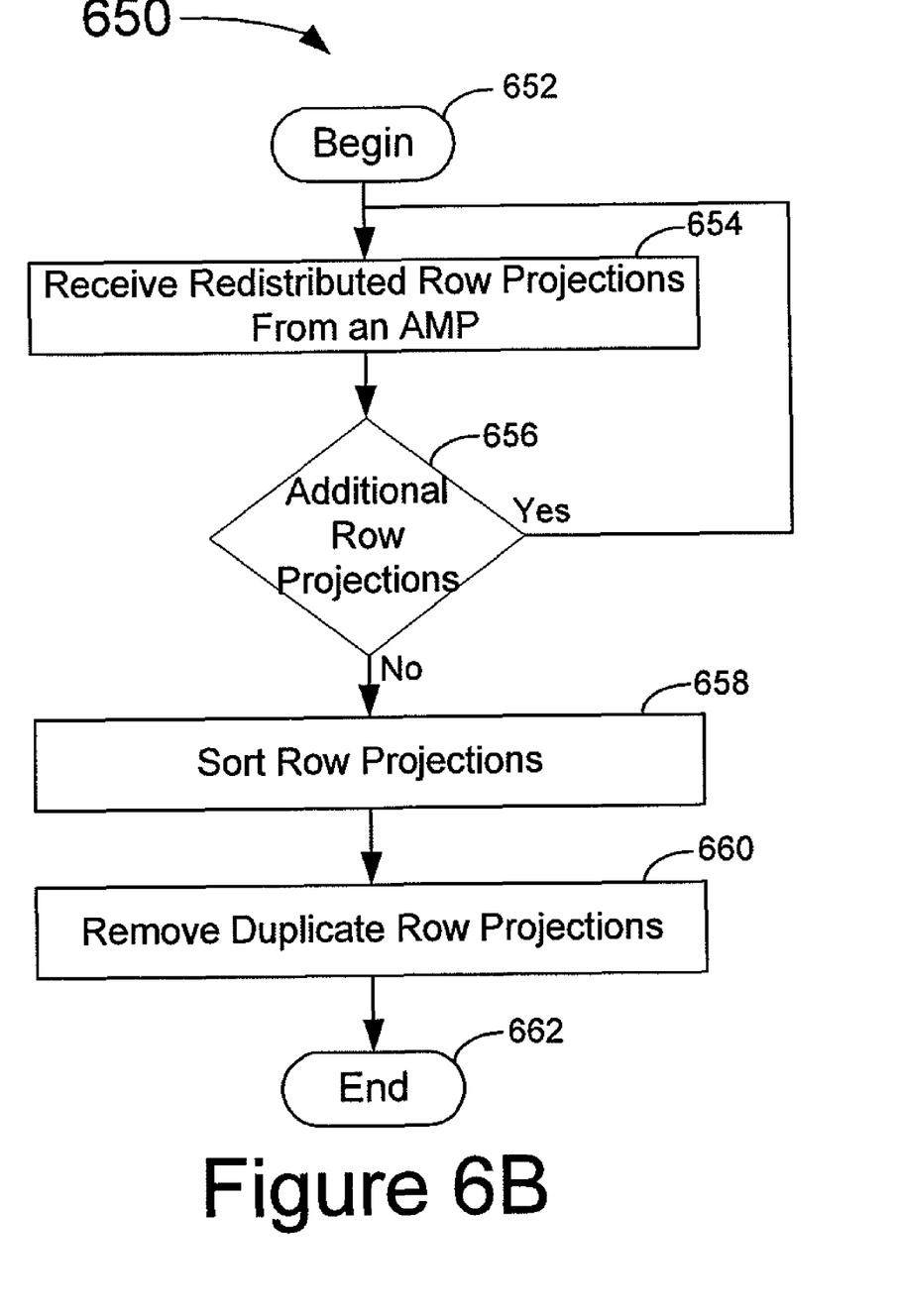
FIG. 6B is a flowchart that depicts processing of a DISTINCT query results receipt processing routine implemented in accordance with an embodiment.

FIG. 6B is a flowchart 650 that depicts processing of a DISTINCT query results receipt processing routine implemented in accordance with an embodiment. The processing steps of FIG. 6B may be implemented as computer-executable instructions tangibly embodied on a computer-readable medium executable by a processing system, such as one or more of the AMPs $210_1$-$210_9$ depicted in FIG. 2.

The query result processing routine is invoked (step 652), and an AMP receives a row projection from one of the AMPs involved in processing the query as a result of redistribution of the row projection (step 654). The AMP may then evaluate whether additional row projections remain to be received (step 656). For example, each AMP may notify the other AMPs involved in the query processing when the particular AMP has completed redistribution of the row projections. If row projection redistributions are still be processed by one or more AMPs, the AMP may then return to step 654 to await receipt of another redistributed row projection.

Returning again to step 656, when the AMP has received all redistributed row projections, the AMP may then sort the results on the selected attribute values (step 658) and remove duplicate values (step 660). The query result receipt processing routine cycle may then end (step 662).

Returning again to FIG. 5A, consider an exemplary query for providing cities in which customers currently reside:

SELECT DISTINCT City from Customers

For illustrative purposes, assume each of the rows 510 are originally distributed to a particular AMP, e.g., AMP $210_1$ depicted in FIG. 2. Further assume the statistics 126 include a list, L, of highly skewed values within the Customers table 500 that specifies the selected attribute, Customers.City, contains one or more highly skewed values, e.g., "New York" and "Chicago".

Figure 5B:
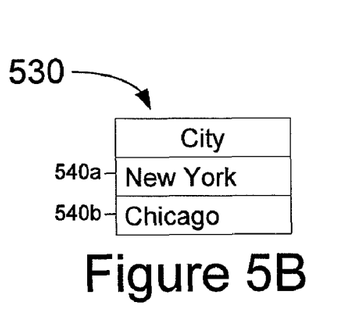
FIGS. 5B-5C are diagrammatic representations of hash tables that facilitate query optimization in accordance with disclosed embodiments.

In this instance, when the AMP first evaluates the Customer.City attribute of a row having a value of "New York", the AMP will add an entry 540a to a hash table 530 allocated to the AMP that specifies the skewed attribute value of "New York" as depicted in FIG. 5B. On a subsequent evaluation of another row having an attribute Customer.City value of "New York", the AMP will discard the row. Assuming the skewed list, L, indicates that the attribute Customer.City value "Chicago" is additionally skewed, the hash table 530 would likewise have an entry 540b entered for the skewed attribute Customer.City value "Chicago". In this manner, the AMP will only redistribute one instance of a row having the Customer.City attribute value of "New York" and one for "Chicago" thereby alleviating a system bottleneck resulting from the selected attribute having highly skewed values.

In accordance with another embodiment, the above described optimization mechanism may be modified to facilitate optimization of aggregation queries, e.g., grouping queries. Consider the following query:

SELECT a, count(*) from T GROUP BY T.a

Assume the statistics 126 indicate skewed values in the attribute T.a. In accordance with an embodiment, a hash table is allocated on each AMP involved in the query. The hash table includes <key, count> entries. The search keys are on skewed values of the attribute on which the query results are to be grouped—skewed values of the attribute T.a in the above example. The value of the count component indicates the number of times the key has been identified by the AMP.

On each AMP, each row allocated to the AMP of the table is read. If the value of the attribute on which the results are to be grouped is skewed, the hash table is checked to determine if the attribute value has an entry in the hash table. If the value of the attribute does have an entry in the hash table, the count for the attribute value is incremented by 1. If no entry for the attribute value has been allocated in the hash table, an entry <T.a, 1> is added to the hash table for the skewed attribute value. If it is determined that the value of the attribute on which the results are to be grouped is not skewed, the row is hash redistributed on the attribute value. After the AMP finishes reading each row of the table, T, the rows of the hash table are redistributed on respective values of the attribute T.a with the corresponding count.

Once all rows have been redistributed, each AMP may then sort the rows redistributed thereto and compute the total counts of the skewed values of the rows redistributed from the system AMPs.

Figure 7A:
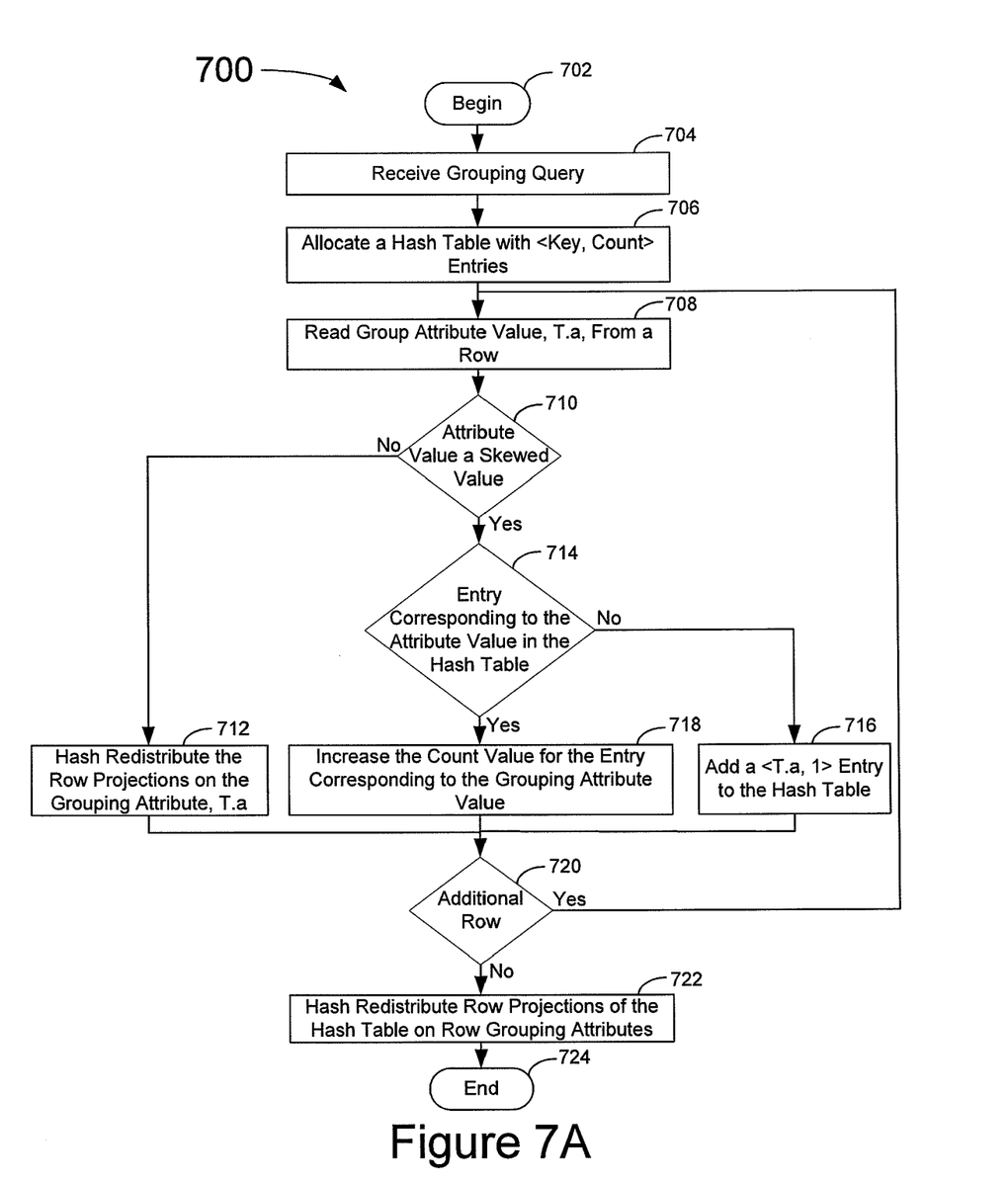
FIG. 7A is a flowchart that depicts processing of a grouping query optimization routine implemented in accordance with an embodiment.

FIG. 7A is a flowchart 700 that depicts processing of a grouping query optimization routine implemented in accordance with an embodiment. The processing steps of FIG. 7B may be implemented as computer-executable instructions tangibly embodied on a computer-readable medium executable by a processing system, such as one or more of the AMPs $210_1$-$210_9$ depicted in FIG. 2.

The grouping query execution routine is invoked (step 702), and a grouping query execution plan is received by the AMP (step 704). A hash table is then allocated for the AMP (step 706). In a particular embodiment, the hash table includes key and count entries. A grouping attribute, T.a, is then read from a row of the table (step 708). The AMP then compares the value of the grouping attribute, T.a, with the list, L, of skewed values and an evaluation is made to determine if the grouping attribute value of the currently evaluated row comprises a skewed value (step 710). If the attribute value is not a skewed value, the row may be hash redistributed on the attribute value (step 712), e.g., according to a "hash value"-to-"processing module" mapping table. The grouping query optimization routine may then proceed to evaluate whether any additional rows remain for evaluation (step 720).

Returning again to step 710, if the attribute value comprises a skewed value, the hash table is evaluated to determine if an entry exists for the skewed attribute value (step 714). If an entry for the attribute value does not exist in the hash table, an entry, <T.a, 1>, is added to the hash table that specifies the skewed value of the grouping attribute, T.a, and a count of "1" (step 716). The grouping query optimization routine may then proceed to determine if an additional row remains for evaluation (step 720).

Returning again to step 714, if an entry already exists for the skewed attribute value, the count for the value of the attribute, T.a, is increased by one in the entry for the attribute value in the hash table (step 718). The grouping query optimization routine may then proceed to determine if any additional rows remain for evaluation according to step 720.

If an additional row remains, the grouping query optimization routine may then return to step 708 to read the grouping attribute, T.a, from the row. When no additional rows remain, the AMP may then hash redistribute rows with necessary attribute projections including corresponding attribute value counts of the hash table on the grouping attribute values (step 722), and the query execution routine cycle may then end (step 724).

Figure 7B:
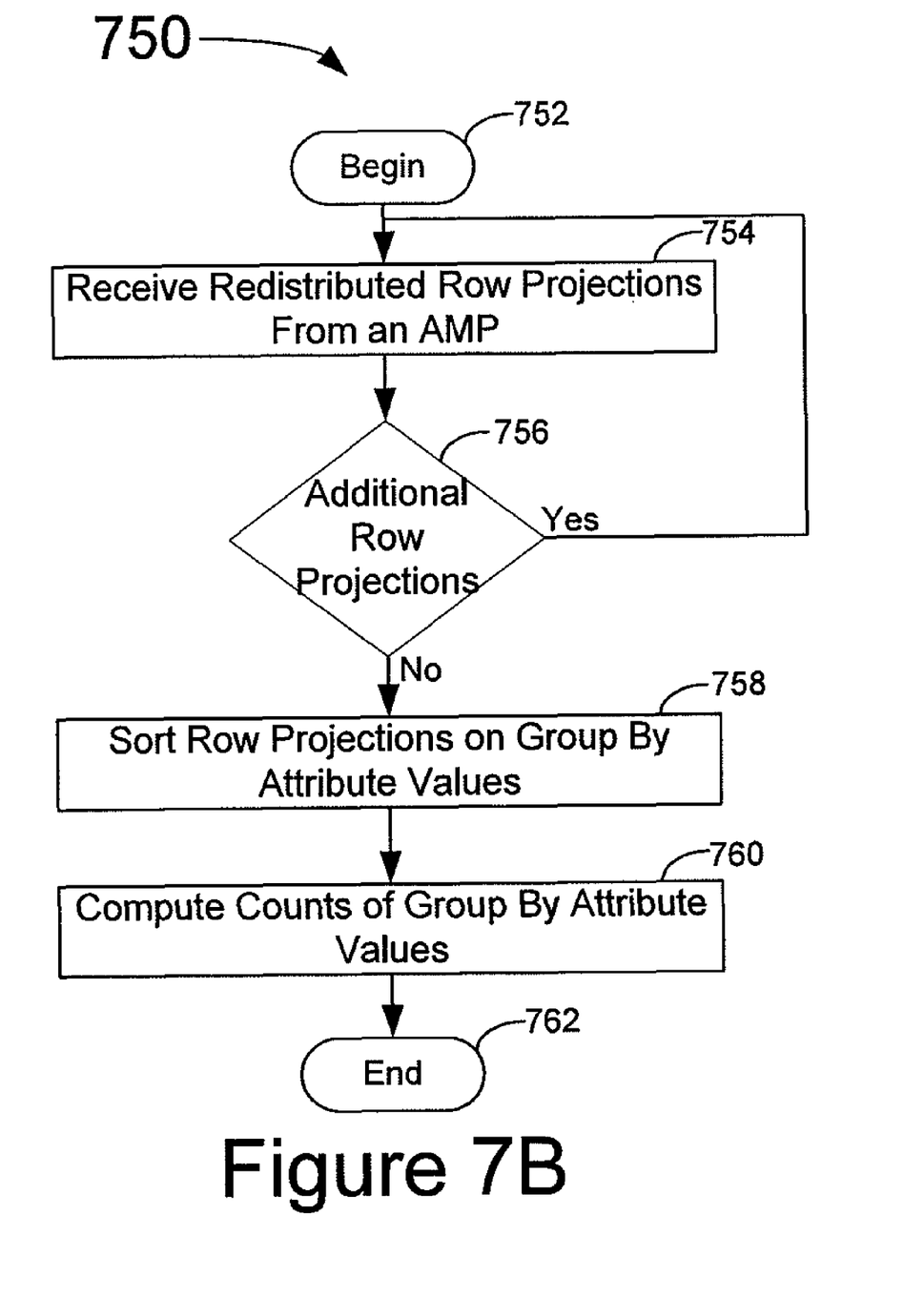
FIG. 7B is a flowchart that depicts processing of a grouping query results receipt processing routine implemented in accordance with an embodiment.

FIG. 7B is a flowchart 750 that depicts processing of a grouping query results receipt processing routine implemented in accordance with an embodiment. The processing steps of FIG. 7B may be implemented as computer-executable instructions tangibly embodied on a computer-readable medium executable by a processing system, such as one or more of the AMPs $210_1$-$210_9$ depicted in FIG. 2.

The query result processing routine is invoked (step 752), and an AMP receives a row projection from one of the AMPs involved in processing the query as a result of redistribution of the row projection (step 754). In the case the row projection is a grouping attribute value that was determined to be skewed by another AMP, the redistributed row projection received by the AMP includes the associated count value accumulated by the AMP that redistributed the row projection. The AMP may then evaluate whether additional row projections remain to be received (step 756). If row projection redistributions are still be processed by one or more AMPs, the AMP may then return to step 754 to await receipt of another redistributed row projection.

Returning again to step 756, when the AMP has received all redistricted row projections, the AMP may then sort the results on the group by attribute values (step 758) and calculate a count of each of the group by attribute values (step 760). For non-skewed group by attribute values, the AMP accumulates a count of each instance of each non-skewed group by attribute value received by the AMP. For skewed group-by attribute values, the AMP sums the count values of the skewed group by attribute values received from one of more of the system AMPs. The query result receipt processing routine cycle may then end (step 762).

Returning again to FIG. 5A, consider an exemplary query for providing cities in which customers currently reside:

SELECT City, count(*) from Customers GROUP BY Customers.City

For illustrative purposes, assume each of the rows 510 are originally distributed to a particular AMP, e.g., AMP $210_1$ depicted in FIG. 2. Further assume the statistics 126 include a list, L, of highly skewed values within the Customers table 500 that specifies the selected attribute, Customers.City, contains one or more highly skewed values, e.g., "New York" and "Chicago".

Figure 5C:
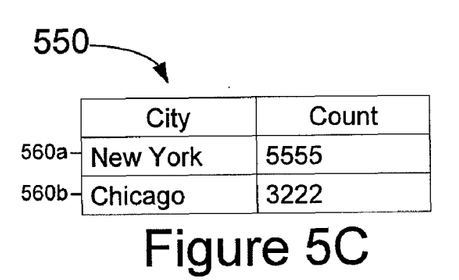

In this instance, when the AMP first evaluates the Customer.City attribute of a row having a value of "New York", the AMP will add an entry 560a to a hash table 550 allocated to the AMP that specifies the skewed attribute value of "New York" as depicted in FIG. 5C. On a first evaluation of a table row having a Customer.City attribute value of "New York", the corresponding count value is set to "1" by the AMP. On a subsequent evaluation of another row having a Customer.City attribute value of "New York", the AMP will increment the count value associated with the Customer.City attribute value of "New York". Assuming the skewed list, L, indicates that attribute Customer.City value "Chicago" is additionally skewed, the hash table 550 would likewise have an entry 560b entered for the skewed Customer.City attribute value of "Chicago". In the illustrative example, the AMP has evaluated 5555 table rows having a skewed Customer.City attribute value of "New York" and 3222 table rows having a skewed Customer.City attribute value of "Chicago". In this manner, the AMP will only redistribute one instance of a row having the Customer.City attribute value of "New York" and one for "Chicago" thereby alleviating a system bottleneck resulting from the selected attribute having highly skewed values. On receipt of redistributed rows, an AMP may sum the count values of common attribute values to calculate an accurate count of the attribute values.

The above approach may be similarly implemented on other types of aggregation queries. For instance, consider the following aggregation query:

SELECT a, sum(b) from T GROUP BY T.a

Assume the group by attribute T.a has highly skewed values. In this instance, the hash table includes entries including fields for the skewed values of the attribute T.a and a field for accumulating the sum of the values of the field T.b. On evaluation of a first record having a skewed value of the attribute T.a, the AMP will add an entry to the hash table that includes the skewed attribute value and the value of the attribute T.b of the corresponding table row. Upon evaluation of another row having the same skewed value for the attribute T.a, the sum field of the hash table entry is increased by the value of the attribute T.b of the corresponding table row.

As another example, consider the following aggregation query:

SELECT a, max(b) from T GROUP BY T.a

Assume the group by attribute T.a has skewed values. In this instance, the hash table includes entries having fields for the skewed values of the attribute T.a and a field for the maximum value of the attribute T.b encountered in a table row having the skewed value of the attribute T.a. In a similar manner, an aggregation query featuring a minimum of the attribute T.b is accommodated by a hash table with an entry for the skewed value of the attribute T.a and a field for the minimum value of the attribute T.b encountered in a row having the skewed value of the attribute T.a.

Other aggregation queries may be similarly accommodated according to the disclosed embodiments. For example, consider the following aggregation query:

SELECT a, avg(b) from T GROUP BY T.a

Assume the group by attribute T.a includes one or more skewed values. In this instance, the hash table includes entries having fields for the skewed values of the attribute T.a, a field for accumulating a count of the number of table rows encountered by the AMP that have the skewed value of the attribute T.a, and another field that accumulates a sum of the values of the attribute T.b of rows having the skewed value in the attribute T.a. In this manner, the average of the attribute T.b may be calculated by an AMP that receives the rows of the hash table via redistribution by dividing the value of the attribute T.b by the count recorded in the corresponding hash table entry. In the instance that an AMP receives results of a common skewed value of the attribute T.a from multiple AMPs as a result of redistribution, the AMP may then sum values of the attribute T.b and corresponding count values and calculate the average therefrom. Other types of aggregation queries may similarly be accommodated according to the described embodiments.

In accordance with other embodiments, the statistics 126 may not include skewed values. In this instance, the described mechanisms may be implemented with dynamic sampling routines that discover skewed values, routines that discover the skewed values at run time without dynamic sampling, or by way of other mechanisms.

As described, mechanisms that facilitate query processing optimization in a parallel processing system are provided. Skewed values and non-skewed values are treated differently to improve upon conventional DISTINCT and aggregation query processing. Each processing module involved in processing of a DISTINCT query has a hash table allocated thereto. The processing module reads attribute values of rows on which a DISTINCT selection is applied and determines whether the attribute value is skewed. For example, the processing module may consult a list of highly skewed attribute values associated with the table to which the query is directed. If the attribute value is skewed, the processing module evaluates the hash table to determine if the skewed attribute value has an entry in the hash table. If an entry exists in the hash table for the attribute value, the row is then discarded. If no entry exists in the hash table for the skewed attribute value, then an entry for the attribute value is added to the hash table. The row from which the attribute value was read is hash redistributed to one of a plurality of processing modules deployed in the parallel processing system on the attribute value after any necessary attribute projections. In the event that the attribute value is not determined to be skewed, then the row may be hash redistributed on the attribute value after any necessary attribute projections. In this manner, system bottlenecks resulting from the repetitive redistribution of rows with highly skewed attribute values on which a DISTINCT selection is applied are alleviated. Processing of aggregation queries are facilitated in a similar manner thereby improving parallel processing system performance.

The flowcharts of FIGS. 6A-7B depict process serialization to facilitate an understanding of disclosed embodiments and are not necessarily indicative of the serialization of the operations being performed. In various embodiments, the processing steps described in FIGS. 6A-7B may be performed in varying order, and one or more depicted steps may be performed in parallel with other steps. Additionally, execution of some processing steps of FIGS. 6A-7B may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of optimizing query processing in a parallel processing system, comprising:

receiving, by a processing module of a plurality of processing modules deployed in the parallel processing system, a query;

reading, by the processing module, a value of an attribute of a row allocated to the processing module of a table on which the query is applied;

determining, by the processing module, that the attribute value comprises a skewed value;

thereafter, evaluating, by the processing module, whether the attribute value that comprises the skewed value has been encountered in another row of the table during processing of the query;

and responsive to the evaluating of whether the attribute value that comprises the skewed value has been encountered in another row, determining whether the attribute value that comprises the skewed value is to be redistributed to one of the plurality of processing modules.

2. The method of claim 1, wherein the query comprises an SQL query with a DISTINCT selection of the attribute.

3. The method of claim 1, wherein the determining of the attribute value comprises a skewed value is performed by comparing the attribute value with a list of skewed attribute values.

4. The method of claim 1, further comprising: allocating, by the processing module, a hash table, wherein the evaluating of whether the attribute value has been encountered comprises determining the attribute value has not been encountered in another row of the table during processing of the query; and adding an entry to the hash table that includes the attribute value.

5. The method of claim 1, further comprising: allocating, by the processing module, a hash table, wherein the evaluating of whether the attribute value has been encountered comprises determining the attribute value has been encountered in another row of the table during processing of the query; and discarding, by the processing module, the row.

6. The method of claim 1, wherein the query comprises a group by query and the attribute comprises a group by attribute, wherein the evaluating of whether the attribute value has been encountered in another row of the table during processing of the query comprises determining the attribute value has not been encountered in another row of the table during processing of the query, the method further comprising: allocating, by the processing module, a hash table; and adding an entry to the hash table that includes the attribute value and an associated count value of one.

7. The method of claim 1, wherein the query comprises a group by query and the attribute comprises a group by attribute, wherein the evaluating of whether the attribute value has been encountered in another row of the table during processing of the query comprises determining the attribute value has been encountered in another row of the table during processing of the query, the method further comprising incrementing a count value associated with the attribute value in an entry of a hash table allocated to the processing module.

8. The method of claim 1, wherein the query comprises a group by query and the attribute comprises a group by attribute and the query further comprises selection of one of a maximum, minimum, and average of a second attribute of the table, the method further comprising: adding an entry for the attribute value in a hash table allocated to the processing module; and adding at least one of a maximum value of the second attribute encountered in a row of the table in which the attribute value is identified, a minimum value of the second attribute encountered in a row of the table in which the attribute value is identified, and a count of the number of rows in which the processing module identifies the attribute value in association with a sum of values of the second attribute encountered in the rows in which the attribute value has been encountered.

9. The method of claim 1, further comprising: allocating, by the processing module, a hash table; adding an entry with the attribute value to the hash table and a respective entry for any other attribute values read from rows of the table that are determined to be skewed; and redistributing, by the processing module, each attribute value of the hash table respectively to one of the processing modules based on a hash value of each attribute value.

10. A non-transient computer-readable medium storing at least computer-executable instructions for execution by a processing system, the computer-executable instructions for optimizing query processing in a parallel processing system, the computer-executable instructions, when executed, cause the processing system to:
receive, by a processing module of a plurality of processing modules deployed in the parallel processing system, a query;
read, by the processing module, a value of an attribute of a row allocated to the processing module of a table on which the query is applied;
determine, by the processing module, that the attribute value comprises a skewed value;
evaluate, by the processing module, whether the attribute value that comprises a skewed value has been encountered in another row of the table during processing of the query; and
responsive to the evaluating of whether the attribute value that comprises a skewed value has been encountered in another row, determine whether the attribute value that comprises a skewed value is to be redistributed to one of the plurality of processing modules.

11. The computer-readable medium of claim 10, wherein the query comprises an SQL query with a DISTINCT selection of the attribute.

12. The computer-readable medium of claim 10, wherein the instructions that determine the attribute value comprises a skewed value comprise instructions that, when executed, cause the processing system to compare the attribute value with a list of skewed attribute values.

13. The computer-readable medium of claim 10, further comprising instructions that, when executed, cause the processing system to: allocate, by the processing module, a hash table, wherein the instructions that evaluate whether the attribute value has been encountered determine the attribute value has not been encountered in another row of the table during processing of the query; and add an entry to the hash table that includes the attribute value.

14. The computer-readable medium of claim 10, further comprising instructions that, when executed, cause the processing system to: allocate, by the processing module, a hash table, wherein the instructions that evaluate whether the attribute value has been encountered determine the attribute value has been encountered in another row of the table during processing of the query; and discard, by the processing module, the row.

15. The computer-readable medium of claim 10, wherein the query comprises a group by query and the attribute comprises a group by attribute, wherein the instructions that evaluate whether the attribute value has been encountered in another row of the table during processing of the query determine the attribute value has not been encountered in another row of the table during processing of the query, the computer-readable medium further comprising instructions that, when executed, cause the processing system to: allocate, by the processing module, a hash table; and add an entry to the hash table that includes the attribute value and an associated count value of one.

16. The computer-readable medium of claim 10, wherein the query comprises a group by query and the attribute comprises a group by attribute, wherein the instructions that evaluate whether the attribute value has been encountered in another row of the table during processing of the query determine the attribute value has been encountered in another row of the table during processing of the query, the computer-readable medium further comprising instructions that, when executed, cause the processing system to increment a count value associated with the attribute value in an entry of a hash table allocated to the processing module.

17. The computer-readable medium of claim 10, wherein the query comprises a group by query and the attribute comprises a group by attribute and the query further comprises selection of one of a maximum, minimum, and average of a second attribute of the table, the computer-readable medium further comprising instructions that, when executed, cause the processing system to: add an entry for the attribute value in a hash table allocated to the processing module; and add at least one of a maximum value of the second attribute encountered in a row of the table in which the attribute value is identified, a minimum value of the second attribute encountered in a row of the table in which the attribute value is identified, and a count of the number of rows in which the processing module identifies the attribute value in association with a sum of values of the second attribute encountered in the rows in which the attribute value has been encountered.

18. A parallel processing system configured to optimize query processing, comprising: at least one storage facility on which a database table is stored; and a plurality of processing modules each allocated a portion of rows of the table, wherein a processing module of the plurality of processing modules is operable to:
receive a query,
read a value of an attribute of a row allocated to the processing module of the table on which the query is applied,
determine the attribute value comprises a skewed value,
evaluate whether the attribute value that comprises a skewed value has been encountered in another row of the table during processing of the query,
and, responsive to the evaluating of whether the attribute value that comprises a skewed value has been encountered in another row, determine whether the attribute value that comprises a skewed value is to be redistributed to one of the plurality of processing modules.

19. The system of claim 18, wherein each of the plurality of processing modules has a respective hash table allocated thereto, and wherein each of the plurality of processing modules adds an entry to the respective hash table after determining a value of the attribute of a respective table row allocated to the processing module comprises a skewed value, wherein the respective table row comprises a first row encountered by the processing module during processing of the query.

20. The system of claim 18, further comprising a list of skewed values of attributes of the table.

21. A computer-implemented method of processing a database query of a database system operable to process data stored in a database, the method c computer-implemented comprising:
obtaining one or more values of an attribute of a first row of a table of the database;
(a) determining whether that at least one of the one or more values of the attribute of the first row of the table is a skewed value;
(b) determining whether the at least one value has been encountered in a second row of the table when the determining (a) determines that the least one value is a skewed value;
discarding the least one value when the determining (b) determines that the at least one has been encountered in a second row of the table; and
redistributing the at least one value when the determining (b) determines that the at least one has not been encountered in the second row of the table.

22. The computer-implemented method of claim 21, wherein the database system includes multiple processing units operable to perform one or more of the obtaining, determining (a), determining (b), discarding and redistricting in parallel.

* * * * *